United States Patent [19]
Coles

[11] 3,933,052
[45] Jan. 20, 1976

[54] PRESSURE COMPENSATED HERMETICALLY SEALED TRANSMISSION SYSTEM

[76] Inventor: Carl R. Coles, 619 Barberry Road, R.D. 1, Center Valley, Pa. 18034

[22] Filed: Oct. 21, 1974

[21] Appl. No.: 516,206

[52] U.S. Cl. .................... 74/18.1; 74/17.8; 74/18; 403/51
[51] Int. Cl.² .................... F16J 15/50; F16J 15/52
[58] Field of Search ............ 74/17.8, 18.1, 18, 60; 403/50, 51

[56] References Cited
UNITED STATES PATENTS

| | | | |
|---|---|---|---|
| 2,255,172 | 9/1941 | Johnson | 74/18.1 X |
| 2,568,226 | 9/1951 | Drake | 403/51 X |
| 2,826,919 | 3/1958 | Klingler | 74/18.1 |
| 3,208,394 | 9/1965 | Taplin | 74/18.1 X |

FOREIGN PATENTS OR APPLICATIONS

| | | | |
|---|---|---|---|
| 1,099,067 | 8/1955 | France | 74/18.1 |
| 482,802 | 4/1958 | United Kingdom | 74/18.1 |
| 290,405 | 8/1953 | Switzerland | 74/18 |
| 149,281 | 8/1961 | U.S.S.R. | 74/18.1 |

Primary Examiner—Benjamin W. Wyche
Assistant Examiner—Parshofam S. Lall
Attorney, Agent, or Firm—Fred Fisher

[57] ABSTRACT

A pressure compensated, hermetically sealed transmission system is described which includes, basically, a hermetic rotary coupling. Rotary motion is applied through a casing, wherein a cylindrically shaped input shaft having a circular inner bearing race affixed to one end is coupled to a generally spherical shaped wobble plate by means of roller or ball bearings. In similar fashion, an output shaft is similarly coupled to the spherical shaped wobble plate at the opposite end. The inner races of the shafts are positioned at an angle and located eccentrically from the respective shaft center line. Both shafts are supported at their outer ends by combination journal thrust bearings, which are coupled to the main casing. The wobble plate is prevented from rotating about the common axis of the two shafts. Thus, as one shaft rotates, the wobble plate rocks, due to ball bearing action, but does not rotate. Likewise, due to the bearing action, as the wobble plate rocks the output shaft rotates. Overall, a system is described which provides for equalization of pressure across imperforate flexible membranes which increase the reliability of the imperforate flexible membranes by providing for pressure feedback through a loop to insure equal pressure on both sides of the imperforate flexible membranes so as to increase the integrity thereof.

5 Claims, 1 Drawing Figure

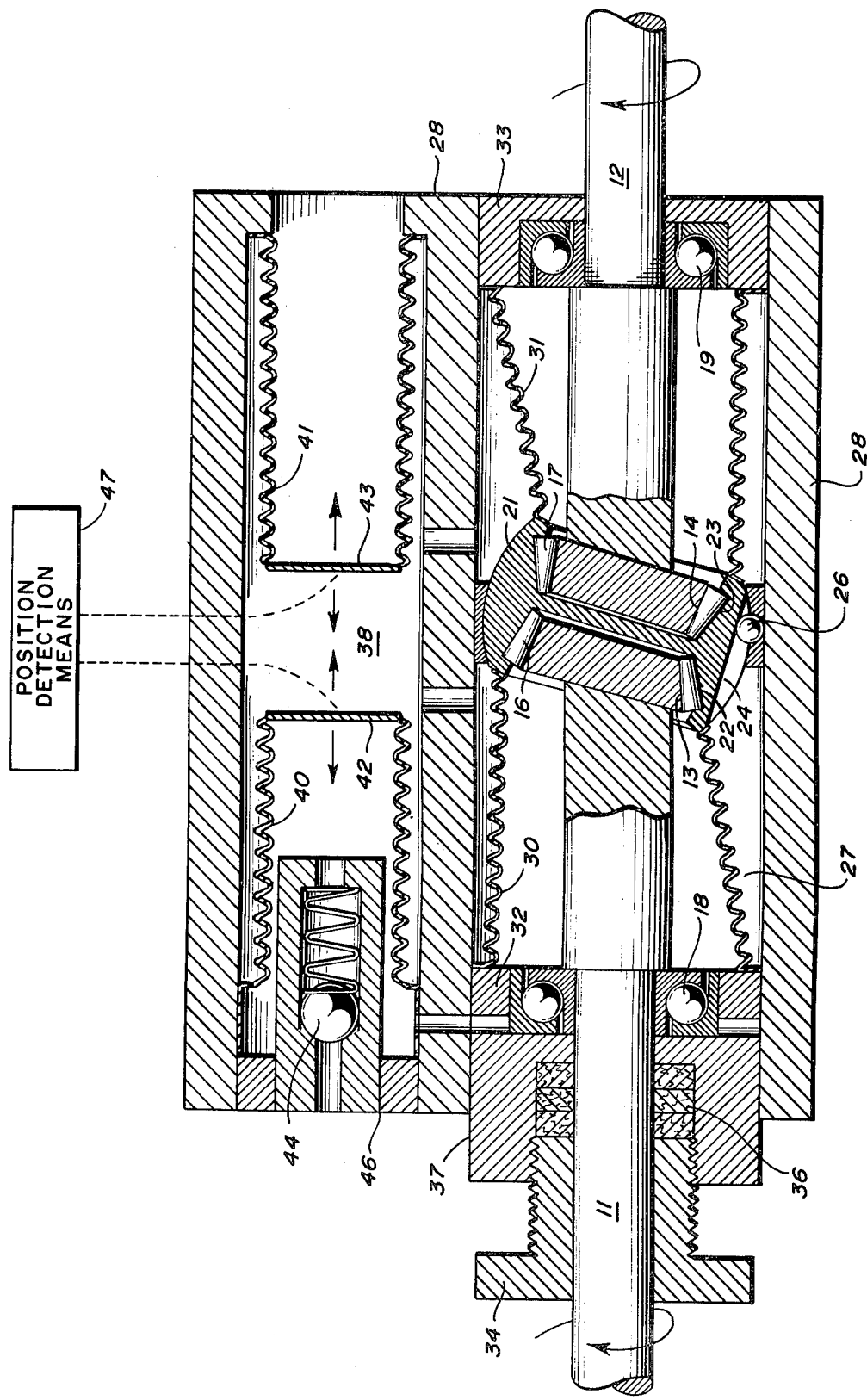

PRESSURE COMPENSATED HERMETICALLY SEALED TRANSMISSION SYSTEM

BACKGROUND OF THE INVENTION

1. Field of the invention

This invention relates to pressure compensated hermetically sealed transmission systems. Accordingly, the general object of the invention is to provide new and improved systems of such character.

2. Description of the Prior Art

In accordance with preliminary novelty searches performed on behalf of the applicant, specifically for the following concepts: (1) Bearings on both sides of a wobble plate, wherein as the wobble plate rocks, the output shaft rotates; and (2) bellow systems with the foregoing, with pressure feedback through an upper loop to insure equal pressure on both sides of the bellows, the following patents of interest were found:

U.S. Pat. No. 2,119,955 — LITTON
U.S. Pat. No. 2,137,303 — NELSON
U.S. Pat. No. 2,770,139 — SHEN et al
U.S. Pat. No. 2,771,787 — RANSON
U.S. Pat. No. 2,779,197 — EMBREE
U.S. Pat. No. 3,010,887 — BAUMGARTEN et al
U.S. Pat. No. 3,028,761 — COLE, JR.
U.S. Pat. No. 3,049,931 — LANG, JR. et al
U.S. Pat. No. 3,424,017 — HASQUENOPH et al

Litton U.S. Pat. No. 2,119,955 and Lang, Jr. et al., U.S. Pat. No. 3,049,931 combine the rocking type of action in a coupling with sealing means and in the case of the Litton patent with a bellows type of seal.

Cole, Jr. U.S. Pat. No. 3,028,761 also discloses use of wobble plates with bellows for hermetic sealing.

Nelson, U.S. Pat. No. 2,137,303, discloses rotating shafts with a bellows type of seal.

Baumgarten et al., U.S. Pat. No. 3,010,887, also discloses rotation of a shaft and the use of bellows seals.

Embree, U.S. Pat. No. 2,779,197, discloses bellows as seals with pressure compensation.

The remaining U.S. patens set forth above are further examples of bellows used as seals in rotary systems.

Other articles of interest include the following two publications:

1. "Look at Forged Valves for Nuclear" by A. K. Velan *Power* September 1973 pp. 44–45
2. "Operating Experience with Valves in Nuclear Power Plants," by K. H. Arriens. *Combustion* February 1974 pp. 31–36

No prior art was found suggesting the use of equalized pressure bellows systems with rotating shafts.

SUMMARY OF THE INVENTION

This invention includes a combination of concepts which provide a solution to the problem of hermetically sealing a motion or power transmitting device at high pressure. More specifically, the present invention finds application in high pressure stem seals for valves, actuators, indicators, pumps, and the like.

One feature of the invention involves a mechanical device for transmitting torque or rotary motion hermetically between two rotatable elements, where the two elements are physically separated into different pressure or fluid environments. The hermetic seal is achieved by using a flexible membrane, such as a bellows or a diaphragm to separate the two rotatable elements.

The second feature of the invention equalizes or minimizes the pressure across the sealing membrane or membranes by sealing with a liquid and a standard or conventional type shaft seal, such as a packing case, friction type mechanical seal, or a magnetic liquid, O-ring seal, while compensating for a change in liquid volume. The second feature also applies to any hermetic motion or power transmitting device using flexible sealing membranes other then the first feature disclosed hereinabove, such as, but not limited to the patents cited above and linear motion or power transmission devices such as hermetically sealed bellows or diaphragm type valves.

One advantage of this invention permits the use of very thin and/or flexible imperforate membranes at high operating pressures by eliminating or drastically reducing the stress caused by the high pressure. The sealing membranes serve the purpose of separating and sealing against fluids not at high pressure.

Another advantage of this invention allows the use of many different types of materials for sealing membranes, such as very thin gauge metal, rubber, plastics, and the like which would normally be unsuitable to seal against high pressure.

Another advantage of this invention includes the use of very large and/or unusually shaped sealing membranes, such as cylindrical or tapered type bellows, bladders of all types, flat diaphragms, free floating pistons and the like.

Another advantage of this invention is to provide an opportunity for a seal comprised of standard, readily available and easily machined parts.

Thus, it is an object of this invention to provide a novel hermetic rotary coupling system, which is simple in design, utilizing symmetrical parts to facilitate manufacture.

Another object of this invention is to provide a novel power transmission device which provides rotary, torsional, or linear motion or power, while maintaining a true hermetic seal.

Another object of this invention is to provide a novel power transmission device which provides a high mechanical efficiency in the rotary seal by using shafts and bearings as the power transmitting members.

Yet another object of this invention is to provide a novel power transmission device which provides a rotary seal that has negligible backlash for accurate positioning, regardless of direction or change of direction, such as for use in controls or control valves.

One object of this invention is to provide a novel power transmission device which utilizes a standard type seal to seal against pressure regardless of whether the processing fluid is a gas or a liquid.

Further advantages of this invention include the provision of a means of adding a sealing fluid which can leak through the standard seal without affecting the integrity of the hermetic seal containing the process fluid.

Other advantages include the following: A design that can easily have redundant seals and compartments to provide a backup seal in the event one of the sealing membranes fails or leaks; a hermetic seal is provided to transmit rotary or linear motion by utilizing external drivers or actuators that can be changed or repaired without affecting the integrity of the piping or vessel holding the process fluid; a hermetic seal can be provided that can sustain pressure surges without affecting the integrity of the hermetic seal; a sealing liquid can be used that can be easily cooled by various methods and still maintain a hermetic seal when the process fluid is at high temperatures; a hermetic seal can be provided that can be easily monitored to indicate a failure of an internal sealing membrane by monitoring the movement of the volume compensating sealing membrane; a hermetic seal can be provided to handle a variety of problem process fluids such as radioactive sodium, poisonous gases, expensive gases such as helium, flammable gas and corrosive fluids such as high pressure steam; a standard pressure seal can be separated from the process fluid to eliminate corrosion or other problems at the standard seal; multiple packing cases can be eliminated along with vacuum seal gas systems as used in conventional seals; and a hermetic seal can be provided that is reasonably compact although somewhat larger than a conventional type seal.

In accordance with one embodiment of this invention a power transmission device includes a hermetically sealed chamber having a first opening in a first wall of the chamber. A second opening is provided in an opposing rear wall of the chamber. The two openings having a common axis. A rigid transmission means, capable of being wobbled and rotatably engaging the interior wall of the chamber, is arranged so as to wobble about a substantially fixed point which lies substantially along the common axis. A first flexible imperforate membrane engages the transmission means and seals the first opening. Likewise, a second flexible imperforate membrane engages the transmission means and seals the second opening. A rotatable driving member, external to the chamber, extends through the first opening of the chamber, whereas, a driven member, external to the chamber, extends through the second opening of the chamber. Means are provided for coupling the driving member to the transmission means for converting the rotary motion of the driving member into a wobbling motion of the transmission means. Means are provided for coupling the transmission means to the driven means for converting the motion of the transmission means into a rotating motion of the driven means.

In accordance with another embodiment of the invention, a power transmission system device for transmitting power from an external environment to an internal environment includes a housing for separating the external environment from the internal environment. The housing has a first opening in a first wall which communicates with the external environment. The housing also has a second opening in an opposing rear wall which communicates with the internal environment. The two openings are aligned along a common axis and form the ends of a first chamber within the housing. A third opening in the first wall and a fourth opening in the rear wall form a second chamber within the housing. Transmission means within the first chamber of the housing are adapted to wobble about a fixed point which lies substantially in the common axis. A rotatable driving member extends from the external environment through the first opening of the housing. Means are provided for coupling the driving member to the transmission means for converting the rotary motion of the driving member into a wobbling motion of the transmission means. A first bearing housed within the first chamber supports the driving member. A driven member external to the housing extends from the internal environment through the second opening of the housing. Means are provided for coupling the transmission means to the driven means for converting the wobbling motion of the transmission means into a rotary motion of the driven means. A second bearing housed within the first chamber supports the driven member. A first flexible imperforate membrane engages the transmission means and seals the first opening at the first bearing. Likewise, a second flexible imperforate membrane engages the transmission means and seals the second opening at the second bearing. A third flexible imperforate membrane affixed to an inner wall of the second chamber seals, in communication, the third opening and a fifth opening which extends from the second chamber to the first bearing on the external environmental side thereof. A fourth flexible imperforate membrane is affixed to the inner wall of the second chamber and seals the fourth opening, while permitting a sixth opening to be unsealed between the first chamber and the second chamber. Pressure sensitive means cover the third opening.

In accordance with yet another embodiment of the invention, apparatus for detecting the reliability of a hermetically sealed torque transmission system, wherein the system includes a first shaft extending from an external environment into the system and a second shaft extending from an internal environment therein, includes a first housing which extends from the external environment to the internal environment and forming a chamber therewithin. The housing includes a first opening at an external environmental side thereof, a second opening at an internal environmental side thereof, and a third opening extending through to the interior of the system. A first flexible imperforate diaphragm engages an inner wall of the chamber and seals the first opening. A second flexible imperforate diaphragm engages the inner wall of the chamber and seals the second opening, whereby the diaphragm jointly seal the third opening from normally free communication with either of said first or second openings. A pressure checking means covers the first opening whereby, with constant pressures in said external and internal environments, a change in chamber volume detected by said pressure checking means occurs upon one or more of the following conditions: (1) a leak or rupture of the first flexible imperforate diaphragm; (2) a leak or rupture at the second flexible imperforate diaphragm; (3) failure of seal at the first opening by said pressure checking means; or (4) failure of reliability the hermetically sealed torque transmission system.

BRIEF DESCRIPTION OF THE DRAWINGS

Other objects, advantages, and features of this invention will become more apparent from the following specification, when read in conjunction with the accompanying drawing, in which: the FIGURE is a cross sectional diagram of one embodiment of the invention.

DESCRIPTION OF A PREFERRED EMBODIMENT OF THE INVENTION

Referring to the FIGURE, which is a longitudinal cross-section illustrating, in diagrammatic view, one embodiment of the invention, there is shown an input or driving shaft 11 and an output or driven shaft 12, each of which has a circular inner bearing race 13, 14, respectively, attached or machined on the ends of the shafts, respectively, for bearings 16, 17, respectively These inner races 13, 14 are positioned at an angle and located eccentrically from the common center axis of the shafts 11, 12. Both shafts 11, 12, are positioned and supported at their outer ends by typical combination journal thrust bearings 18, 19. Though the bearings 16, 17 are illustrated as roller bearings, ball or other type of bearings can be used in lieu thereof.

A wobble plate 21 is machined from a solid ball so as to hold and become the outer bearing races 22, 23 for the bearings 16, 17. A slot 24 is machined into the spherical surface of the wobble plate 21 and is positioned by a ball or guide member 26 which acts to inhibit the wobble plate 21 from rotating, but not from wobbling in the main bore 27 of the main casing or housing 28.

As rotary motion is applied to the input or driving shaft 11, such motion is transferred through to the wobble plate 21 to the output or driving shaft 12. Such action occurs due to the direct moment provided by the eccentrically located inner bearings races 13, 14, and due to a wedging action caused or contributed by the angle of the shafts 11, 12 with respect to the wobble plate 21.

Flexible imperforate membranes, such as flexible diaphragms or bellows 30, 31, are attached to the wobble plate 21 and to its respective journal thrust bearing support 32, 33. A packing gland 34, packing 36, and a packing case 37 together act as a standard shaft packing seal although a mechanical or magnetic fluid shaft seal may serve a similar purpose.

A separate bore 38 in the casing 28 has flexible imperforate membranes such as flexible diaphragms or bellows 40, 41 located therein. The bellows 40 encloses the leftmost portion of the bore 38, while the bellows 41 encloses the rightmost portion of the bore 38. These bellows 40, 41 have end plates 42, 43, respectively, which act to form a seal for the center portion of the bore 38, and thus provide two separate cavities or chambers from the pressurized side of the output shaft seal to the opposite side of the input shaft seal. One cavity includes that space (at the top left of the drawing) enclosed by the bellows 40, the left passageway (unnumbered) leading to the journal thrust bearing 18, and the space enclosed (bottom left of the drawing) by the bellows 30. The other cavity includes that space in the separate bore 38 (at the top center of the drawing) outside of the bellows 40, 41. The two vertical passageways (unnumbere and that space in the main bore 27 which lies outside of the bellows 30, 31 form a portion of such other cavity. These cavities or chambers are filled with any suitable liquid or lubricant depending upon the temperature, pressure and duty of the seal. The journal thrust bearings 18, 19 are not seals and, hence, fluid is permitted to flow into the bellows or flexible membranes 30, 31. The journal thrust bearing 19 permits the process gas or liquid being sealed to enter into the bellows or flexible membrane 31 and encompass the bearing races 14, 23.

As pressure is applied to the inside of the bellows or flexible membranes 31, 41 by the process fluid, it is equalized by the liquid throughout the central cavity or chamber consisting of the volume on the outside of all four bellows or flexible membranes 30, 31, 40, 41. Pressure is transmitted by the liquid through the bellows or flexible membrane 40 through the cavity or chamber consisting of the inside of the bellows or flexible membranes 40 and 30. This eliminates stress due to differential pressure across all the bellows or flexible membranes 30, 31, 40, 41.

As the sealing liquid leaks through the packing 36, the bellows or flexible membranes 40, 41 move to compensate for the loss of liquid by reducing the volume of liquid. Such movement can be monitored to indicate packing leakage. The relative movement of bellows or flexible membranes 40, 41 to each other can be monitored to indicate an internal leak or membrane failure and where the leak is located.

A pressure checking means, including a standard ball check valve 44, covers an opening 46 in the main casing, which opening 46 is enclosed by the bellows 40.

With constant pressures on either the external or internal environments on both sides of the housing 28, a change in pressure indicated by the pressure checking means occurs upon one or more of the following conditions: (1) a leak or rupture of the bellows 40; (2) a leak of rupture of the bellows 41; (3) failure of seal of the check valve 44 of the opening 46; or, (4) failure of reliability of the hermetically sealed torque transmission system overall shown in the figure.

Although a standard ball check valve 44 is depicted in the figure, other check valves can be used in lieu thereof. The check valve 44 permits additional sealing liquid to be added to the system while the seal is operating to compensate for any leakage that may occur through the packing 36.

The pressure checking means, desirably, further includes a position detection means 47 for detecting the positions of the end plates 42, 43 of the bellows 40, 41. Such position detection means 47 may be optical, mechanical, magnetic, electrical, or any combination thereof, in character, depending upon the process fluids involved. The side wall of the casing 28 may be transparent, in certain applications, so that the positions of the end plates may be optically viewed. Desirably, however, automatic alarm system should be provided, such as an electrical system, to reduce operator error.

It will be appreciated by those skilled in the art that several concepts described herein can be used either separately or in combination with each other. For example, one concept involves the transmission of power by a driving shaft to a drive shaft using a wobble plate for the conversion of rotary power to wobbling motion, and from wobbling motion to rotary motion, whereas another concept invloves an apparatus for detecting the reliability of the hermetically sealed torque transmission system utilizing pressure checking means in a combination apparatus as set forth more specifically in the appended claims.

It will be appreciated that many variations may be performed without departing from the spirit and scope of this invention. In particular, various materials may be used for bellows, or membranes, depending upon the environmental conditions. Bellows or membranes can be formed of rubber, plastic, metal and the like. Likewise, the bellows or membranes need not form any specific configuration; other types of diaphragms can be used in lieu thereof.

What is claimed is:

1. A power transmission device comprising
   a. a hermetically sealed chamber having a first opening in a first wall of said chamber, and a second opening in an opposing rear wall of said chamber, said openings having a common axis;
   b. rigid transmission means, capable of being wobbled, nonrotatably engaging the interior wall of said chamber, said transmission means being arranged to wobble about a substantially fixed point lying substantially along said common axis;

c. a first flexible imperforate membrane engaging said transmission means and sealing said first opening;
d. a second flexible imperforate membrane engaging said transmission means and sealing said second opening;
e. a rotatable driving member external to said chamber and extending through said first opening of said chamber;
f. a driven member external to said chamber and extending through said second opening of said chamber;
g. means coupling said driving member to said transmission means for converting the rotary motion of said driving member into a wobbling motion of said transmission means; and
h. means coupling said transmission means to said driven means for converting the motion of said transmission means into a rotating motion of said driven means.

2. A power transmission device for transmitting power from an external environment to an internal environment comprising
a. a housing for separating said external environment from said internal environment, said housing having a first opening in a first wall communicating with said external environment, said housing having a second opening in an opposing rear wall communicating with said internal environment, said openings being aligned along a common axis and forming the ends of a first chamber within said housing, a third opening in said first wall and a fourth opening in said rear wall forming a second chamber within said housing;
b. transmission means within said first chamber of said housing being adapted to wobble about a fixed point lying substantially in said common axis;
c. a rotatable driving member extending from said external environment through said first opening of said housing;
d. means coupling said driving member to said transmission means for converting the rotary motion of said driving member into a wobbling motion of said transmission means;
e. a first bearing housed within said first chamber for supporting said driving member;
f. a driven member external to said housing and extending from said internal environment through said second opening of said housing;
g. means coupling said transmission means to said driven means for converting the wobbling motion of said transmission means into rotary motion of said driven means;
h. a second bearing housed within said first chamber for supporting said driven member:
i. a first flexible imperforate membrane engaging said transmission means and sealing said first opening at said first bearing;
j. a second flexible imperforate membrane engaging said transmission means and sealing said second opening at said second bearing;
k. a third flexible imperforate membrane affixed to an inner wall of said second chamber and sealing in communication said third opening and a fifth opening extending from said second chamber to said first bearing on the external environmental aide thereof;
l. a fourth flexible imperforate membrane affixed to said inner wall of said second chamber and sealing said fourth opening, while permitting a sixth opening to be unsealed between said first chamber and said second chamber; and
m. pressure sensitive means covering said third opening.

3. Apparatus for detecting the reliability of a hermetically sealed torque transmission system, wherein said system includes a first shaft extending from an external environment into said system, and a second shaft extending from an internal environment into said system, comprising
a. a housing extending from said external environment to said internal environment, and forming a chamber therewithin including
   1. a first opening at an external environmental side thereof;
   2. a second opening at an internal environmental side thereof; and
   3. a third opening extending through to the interior of said system;
b. a first flexible imperforate diaphragm engaging an inner wall of said chamber and sealing said first opening;
c. a second flexible imperforate diaphragm engaging said inner wall of said chamber and sealing said second opening, whereby said diaphragms jointly seal said third opening from normally free communication with either of said first or second openings; and
d. pressure checking means covering said first opening, whereby with constant pressure in said external and internal environments, a change in pressure detected by said pressure checking means occurs upon one or more of the following conditions;
   1. a leak or rupture of said first flexible imperforate diaphragm;
   2. a leak or rupture of said second flexible imperforate diaphragm;
   3. failure of seal of said first opening by said pressure indicating means; or
   4. failure of reliability of said hermetically sealed torque transmission system.

4. Apparatus as recited in claim 3, wherein fluid can be added via said pressure checking means to compensate for fluid loss from said housing.

5. Apparatus as recited in claim 2 wherein fluid can be added via said pressure sensitive means to compensate for fluid loss past said first bearing.

* * * * *